United States Patent
Mutsaers

(10) Patent No.: US 6,343,660 B1
(45) Date of Patent: Feb. 5, 2002

(54) FRONT IMPLEMENT CONTROL

(76) Inventor: Franciscus Hubertus Mutsaers, Graauwedijk 32, Overschild (NL), 9625 PC (*) Notice: Subject to any disclaimer, the term of this patent is extended or adjusted under 35 U.S.C. 154(b) by 0 days.

(21) Appl. No.: 09/669,078

(22) Filed: Sep. 25, 2000

Related U.S. Application Data

(63) Continuation of application No. PCT/NL99/00175, filed on Mar. 26, 1999.

(30) Foreign Application Priority Data

| Mar. 26, 1998 | (NL) | ............................................. 1008723 |
| Sep. 9, 1998 | (NL) | ............................................. 1010041 |
| Mar. 4, 1999 | (NL) | ............................................. 1011442 |

(51) Int. Cl.$^7$ .......................................... A01B 59/048
(52) U.S. Cl. .................................................... 172/273
(58) Field of Search ............................... 172/273, 274, 172/280, 307, 811, 813, 817, 810, 373, 826

(56) References Cited

U.S. PATENT DOCUMENTS

| 3,592,273 A | | 7/1971 | Martin |
| 3,669,194 A | * | 6/1972 | Zurek ........................ 172/280 |

FOREIGN PATENT DOCUMENTS

| DE | 36 07 691 A1 | 10/1986 |
| EP | 0 302 238 A1 | 2/1989 |
| EP | 0 761 081 A1 | 3/1997 |
| FR | 2 564 690 | 11/1985 |
| GB | 2 162 032 A | 1/1986 |
| GB | 2 175 484 A | 12/1986 |

OTHER PUBLICATIONS

International Search Report for PCT/NL99/00175.

* cited by examiner

Primary Examiner—Robert E. Pezzuto
(74) Attorney, Agent, or Firm—Altera Law Group, LLC.

(57) ABSTRACT

A steering gear for controlling an implement suspended in front of a tractor, with a yoke structure for coupling to a tractor, a steerable part, and at least two transmission structures, spaced apart in transverse direction, between the steerable part and the yoke structure and engaging the steerable part in laterally spaced apart engagement positions. If the steerable part is moved to the left, it is steered rightwards by the transmission structures and vice versa by displacing the steerable part forward at one engagement position. At the other engagement position rearwards displacement, if any, is at least immediately or within a specific lateral movement path, limited to displacement substantially smaller than the forward displacement at the other engagement position. Thus, an accurate course of the implement along an intended processing path is obtained.

33 Claims, 6 Drawing Sheets

FRONT IMPLEMENT CONTROL

This application is a continuation of PCT/NL99/00175 filed Mar. 26, 1999.

FIELD OF THE INVENTION

The invention relates to a steering gear according to the introductory part of claim 1, and also according to the introductory part of claim 2. Such a gear is known from German patent application 36 07 691.

DESCRIPTION OF RELATED ART

For different agricultural tilling operations, it is important that an implement be moved along a predetermined path with great precision. Examples of such operations are hoeing and row-spraying, where the implement, which may for instance carry several hoes or spraying nozzles, must be controlled with very slight lateral deviations relative to the rows of plants, to enable hoeing close along the plants without damaging them or to succeed with a narrow spraying track without missing any plants or at least parts thereof. Normally, row-cultivated plants are arranged in rows that are as straight as possible, so that during the operation, steering is usually limited to minor steering corrections or following faint curves around mountain slopes and obstacles or on headlands.

To obtain a very taut course of the implement, it is known to provide the implement with tracking guides, such as tracking disks, wheels with tires or slides, which engage the soil and prevent lateral movements of the steerable part and the implements relative to the soil. However, the implement must steer along with the tractor, so that the implement remains steerable by the tractor.

In the construction known from the above German patent application 36 07 691, the transmission structures are of such design that the steerable part of the gear and the implement connected thereto can swivel about an imaginary point of rotation located before the point where the aggregated forces exerted by the soil on the implement act on that implement. As a result, the implement steers leftwards in reaction to a lateral movement to the right relative to the tractor and vice versa, so that it is centered relative to the imaginary point of rotation and can follow steering movements of the tractor, just like a trailer traveling behind a tractor, which trailer is hitched to that tractor for pivoting around a ball of a towing hook.

When such a steerage is used, the course of the implement along an intended path still proves to be insufficiently accurate for different applications, such as hoeing. Sometimes, the implement swerves out spontaneously. In itself, this already forms an adverse deviation from the intended path and moreover often causes the operator to perform steering corrections which, in combination with the implement following the imaginary point of rotation, cause an oscillating movement of the actual path around the ideal path. In particular, if the operator steers less adequately, it will take some time before the ideal path is followed sufficiently accurately again. In particular for the tilling operations discussed, which require great precision, the steering gears known from these patent applications therefore prove to be inadequate.

SUMMARY OF THE INVENTION

It is an object of the invention to provide a gear which allows an intended straight or faintly curved path to be followed more accurately, but which can still follow steering movements induced by the tractor. In accordance with the invention, this object is realized by designing a steerage of the type indicated hereinabove according to the characterizing part of claim 1 and/or according to the characterizing part of claim 2.

Because during lateral movements of the steerable part, the steerable part on the side of the other one of the engagement positions moves backwards less than in the known gear, the influence of uneven rearwardly directed loads on is the implement on those lateral displacements of the implement is substantially limited or practically eliminated Such uneven loads on the implement may for instance be caused when the soil on the left-hand side of the tractor offers more resistance than the soil on the right-hand side of the tractor.

Nevertheless, due to the forward movement at one of the engagement positions, lateral movements of the implement relative to the tractor, which are for instance caused by steering movements of the tractor, do result in such steering movements of the steerable part and the implement attached thereto, that the implement sufficiently steers along with the tractor and in each case sufficiently returns into a position located centrally before the tractor. When the tractor is for instance steered through bends, the steering of the bend imposes a lateral movement of the steerable part with the implement relative to the yoke structure and the tractor. This movement of the tractor forces the steerable part and the implement to steer the same bend, while the lateral force required for effecting this can be controlled by means of the steerage of the tractor.

During steering movements to the left, the steerable part and the implement attached thereto rotate about a point of rotation or at least about momentary points of rotation at a distance to the left of the central longitudinal plane, and during steering movements to the right, they rotate about a different point of rotation or at least about other momentary is points of rotation at a distance to the right of the central longitudinal plane. Since in steering movements from the central position, the point of rotation about which the steerable part rotates is located immediately at a distance to the left or right of the central longitudinal plane, a steering movement and possibly an associated lateral movement of the steerable part are only induced in the case of a highly uneven distribution of loads over the width of the implement. Consequently, in the gear proposed, lateral movements of the implement due to such loads that are unevenly distributed over the width of the implement hardly occur, if at all.

Because of the reduced influence of external load variations on the movements of the steerable part of the coupling and the implement relative to the yoke structure, the accuracy with which, during the tilling operation, the intended path can be followed is improved considerably.

In the dependent claims, particularly advantageous embodiments of the invention are laid down.

BRIEF DESCRIPTION OF THE DRAWINGS

The above-mentioned object and further objects and constructional aspects of the invention are specified on the basis of the following description of a number of exemplary embodiments. For this, reference is made to the accompanying drawings, wherein, in schematized form.

DETAILED DESCRIPTION OF THE INVENTION

Figure 1:
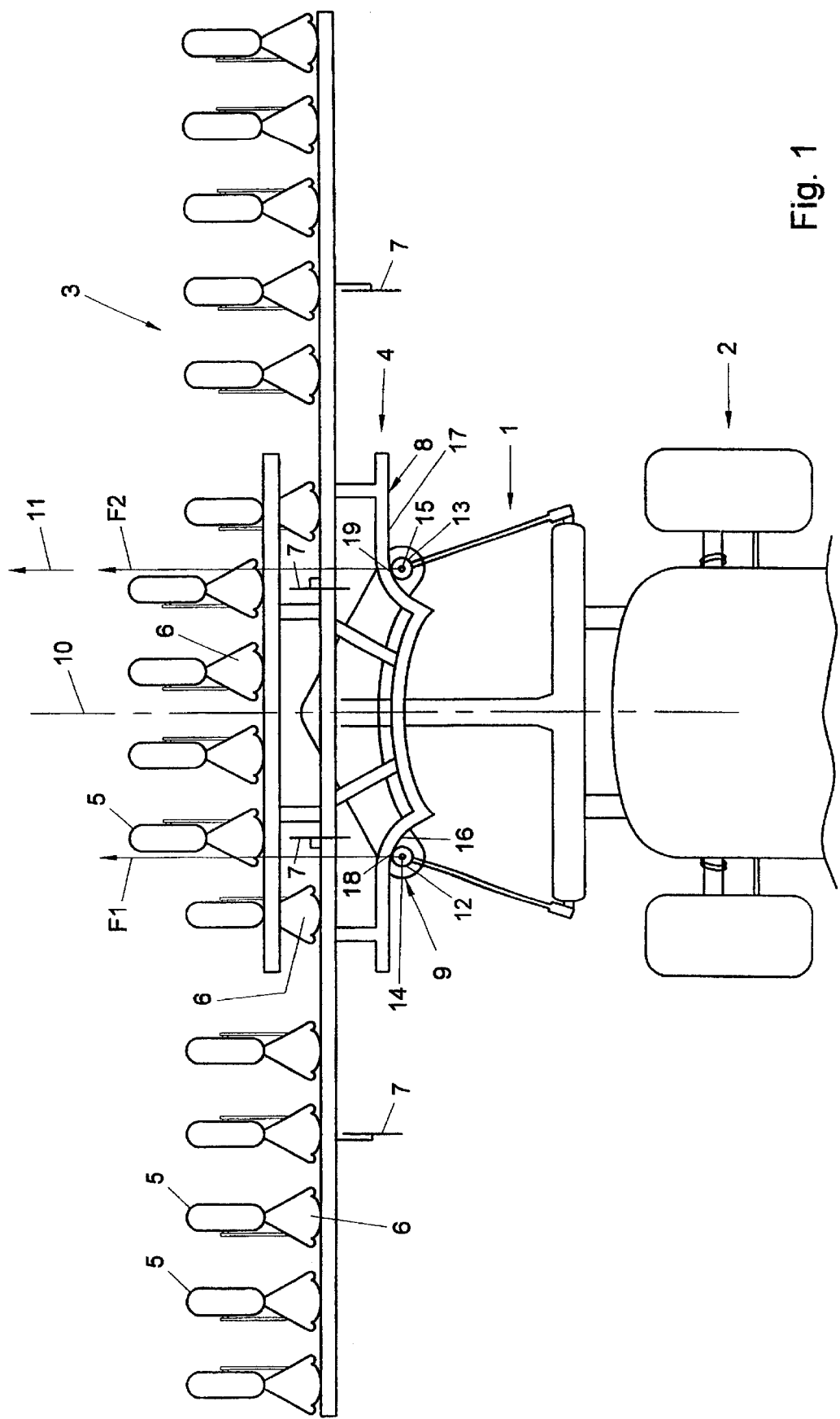
FIG. 1 is a top plan view of an implement with a coupling for suspending that implement in front of a tractor.

In FIG. 1, reference numeral 1 denotes a three-point suspension at the front of a tractor 2. Further, by means of a coupling 4, an implement 3 is hitched to the three-point suspension 1.

The implement 3 is a hoeing implement having a number of support wheels, some of which have been designated by a reference numeral 5, a number of hoes, some of which have been designated by a reference numeral 6, and a number of tracking disks 7.

Incorporated into the coupling 4 between the tractor 2 and the implement 3 mounted in front of the tractor 2 is a steering gear for controlling the implement 3. According to this example, this steering gear is composed of a steerable part 8 carrying the implement 3, a yoke 9 coupled to the three-point suspension 1 of the tractor 2, and at least two transmission structures between the steerable part 8 and the yoke 9, which transmission structures, in a straight-on position in top plan view, are spaced apart in a direction transverse to the processing direction (arrow 11). According to this example, the transmission structures in the straight-on position lie symmetrically relative to a vertical central longitudinal plane 10. This is advantageous if a symmetrical steering behavior is desired, for instance when implements are used that are symmetrical relative to the tractor.

These transmission structures are each formed by a roller 12, 13 that is bearing-mounted for rotation about a vertical axis 14, 15, and by a guideway 16, 17, in top plan view, against which the roller 12, 13 abuts and along which the roller 12, 13 can roll, These transmission structures define engagement points 18, 19 for exerting forces F1, F2 having at least a component in a processing direction on the steerable part 8. In the gear according to this example, the transmission structures are of such design, that the forces exerted on the steerable part 8 in the straight-on position are directed substantially parallel to the vertical central longitudinal plane 10. This partly effects the stable and smooth course of the implement 3. Indeed, imbalance between the rearward forces exerted on the implement 3 on either side of the tractor 2 is not compensated through swiveling of the steerable part 8 and the implement 3.

When the tractor for instance steers to the right, the tracking disks—forming guides for guiding the steerable part in processing direction relative to the soil—prevent the steerable part from directly moving along laterally. This brings about a displacement of the steerable part 8 to the left relative to the yoke 9. Due to the course of the guideway 16, the steerable part 8 is pushed forwards on the left-hand side thereof, so that the steerable part 8 and the implement 3 attached thereto steer rightwards. Accordingly, when the tractor 2 travels straight forwards, the implement 3 will return into the straight-on position located centrally in front of the tractor 2. When the tractor 2 describes a curve, the implement 3 will continue to steer along, until shortly after the bend has been ended. Displacement of the steerable part to the right involves the reverse effect. The lateral movements of the implement 3 and the steerable part to which it is attached can be effected in that the tractor 2 is steered leftwards or rightwards, or in that the implement 3 runs leftwards or rightwards relative to the tractor 2, due to external influences, such as a slope in the ground transverse to the direction of travel or differences in transverse forces exerted on the hoes 6.

The guideways 16, 17 are of such design, that during a lateral displacement of the steerable part 8 relative to the yoke 9 from the straight-on position, the steerable part 8 at one of the engagement points 18, 19 immediately moves forwards relative to the yoke 9, and at the other one of the engagement points 18, 19 does not essentially move rearwards.

In this manner, lateral displacement of the steerable part 8 relative to the yoke 9 on the one hand does cause a steering movement of the steerable part, but on the other, the influence of differences between rearward forces exerted on the implement 3 on the left-hand side and the right-hand side of the central longitudinal plane 10, on lateral displacements of the steerable part 8 and the implement 3 is limited considerably.

The fact that during lateral displacement to the left, the steerable part 8 does not essentially move rearwards at the transmission structure on the right-hand side of the central longitudinal plane 10, and that the forces exerted on the steerable part 8 by the transmission structures are directed substantially parallel to the central longitudinal plane 10, is in the gear according to FIG. 1 caused in that in the straight-on position, the engagement points 18, 19 act on a side on a preferably straight portion of the guideway 16, 17 oriented substantially at right angles to the central longitudinal plane 10.

The straight sections of the guideways 16, 17 blend with curved sections of those guideways, so that during lateral displacements of the steerable part 8, the steering operation does not cause any jolting movements.

During lateral displacement of the steerable element 8 relative to the yoke 9, the difference between the forward displacement of the steerable part 8 at one transmission structure and the slight or zero rearward displacement of the steerable part 8 at the other transmission structure, is in the gear according to this example realized in that the guideway extends according to a curved path and, starting from the straight-on position, the angle of that path relative to the central longitudinal plane 10 on one side of the associated guide element 12, 13 is in each case smaller than on the other side of that guide element 12, 13. Accordingly, in the gear according to this example and starting from the straight-on position, the guide elements 12, 13, during lateral displacement outwards, rove forwards more than they move rearwards during lateral displacement inwards.

The guideways 16, 17 are symmetrical and spaced apart on either side of the central longitudinal plane 10 and extend horizontally. To prevent the guide elements 12, 13 from leaving the guideways 16, 17, the guideways 16, 17 may be profiled and the guide elements, viewed in section transversely to the guideways 16, 17, may have a contour corresponding to that profile.

The fact that in the gear according to this example, the guide elements are provided with rollers offers the advantage that the transmission structures can resist heavy loads and, in spite of that, run along the guideways 16, 17 with little friction. In this manner, wear caused by dirt that has come between the guideways and the guide elements remains limited as well.

In the gear according to this example, the path along which the steerable part 8 moves during lateral displacements relative to the yoke 9 is adjustable in that the distance between the rollers 12, 13 is adjustable. If the distance between the rollers is reduced, a more sensitive control is obtained and, accordingly, a better maneuverability, but also a higher sensitivity to imbalance between the forces exerted on the implement 3 in rearward direction on either side of the central longitudinal plane 10. Such a setting is suitable for operating in a relatively homogeneous soil, where the tautness of the path along which the processing means operate does not have to meet such high requirements, but where relatively many bends have to made. If the distance between the rollers is increased, the steerable element 8 may move slightly sidewards without steering. In that case, the steering gear allows some lateral movement of the implement 3 relative to the tractor, which is advantageous if the tractor makes rather strong lateral movements, for instance because of irregularities in the ground, and if it is desired that the implement be particularly guided by the guides engaging the soil, such as tracking disks. Such a setting is in particular suitable if straight lines are to be run very accurately, wherein the rearward force exerted on the implement vary substantially, for instance due to changes in vegetation or soil condition, or wherein the tractor moves to and fro substantially, for instance because of irregularities in the ground, but wherein relatively few curves and in particular few sharp curves have to be made.

For adjusting the distance between the rollers 12, 13, the yoke 9 is provided with different mounting positions (in the drawing concealed by the rollers 12, 13) for the rollers 12, 13.

Figure 2:
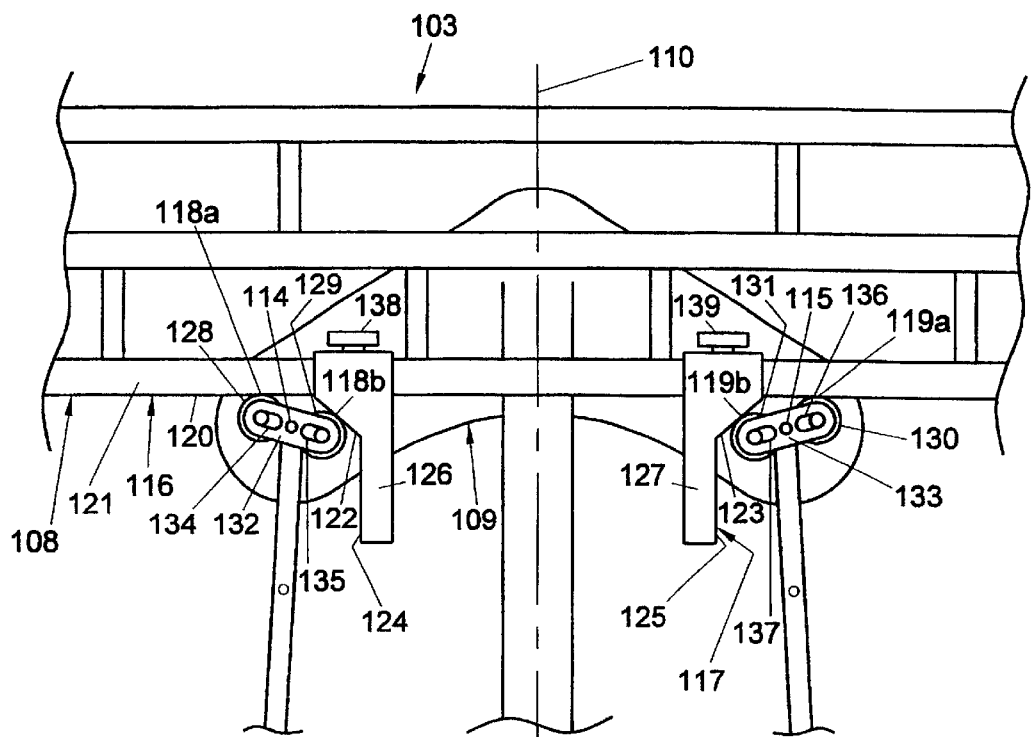
FIG. 2 is a cut-off top plan view of a portion of an implement with a second coupling for suspending that implement in front of a tractor.
Figure 3:
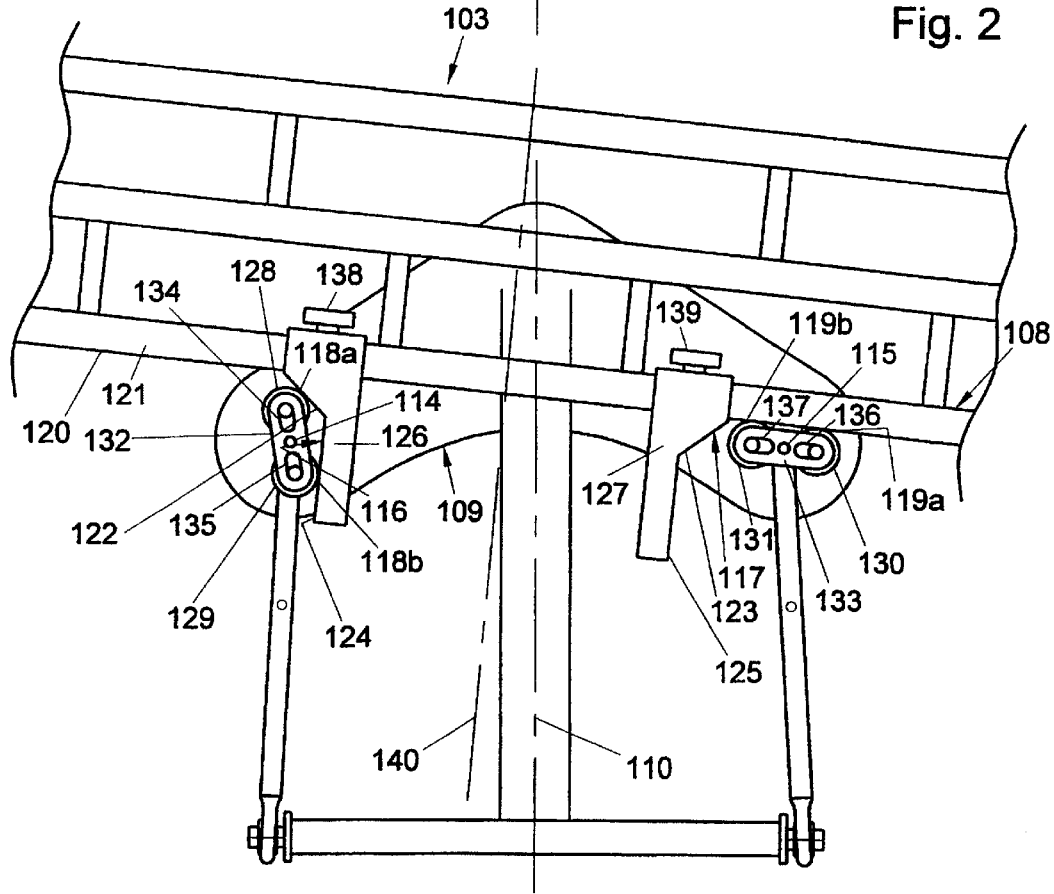
FIG. 3 is a cut-off top plan view corresponding to FIG. 2, with the coupling being in a swiveled-out position.

In the construction shown in FIGS. 2 and 3, instead of the blending guideways 16, 17 shown in FIG. 1, bent guideways 116, 117 are used, formed by the rear side 120 of a beam 121 of the implement 103 and surfaces 122, 123, 124, 125 of adjustable guides 126, 127, which surfaces extend at angles relative to that rear side 120. Instead of single rollers 12, 13, sets of in each case two rollers 128, 129, 130, 131 are used, suspended in the roller supports 132, 133 which are pivotable about axes 114, 115 relative to the yoke 109. The rotation axes of the rollers 128–131 are in each case located on either side of the pivotal axes 114, 115 of the roller supports 132, 133. This offers the advantage that the guideways 116, 117 can readily be assembled from straight semi-finished products, but yield blending paths of movement of the steerable part 108 relative to the yoke 108 all the same.

The distance between two rollers 128, 129 and 130, 131 of each roller support 132, 133 is adjustable in that the rollers 128–131 are each mounted in a slot 134–137 in the relevant roller support 132, 133. Thus, the course of the relative movement of the steerable part 108 relative to the yoke 109 can readily be adjusted.

The positions of the guideways 116, 117 can also be adjusted for adjusting the path along which the steerable part 10 moves relative to the yoke 109 during lateral displacement. To this end, the guides 126, 127 are adjustable along the beam 121 of the steerable part 108 for adjusting the interspace between the guides 126, 127. For this purpose, the guides 126, 127 are provided with clamp screws 138, 139 which, in tightened condition, engage the beam 121. The adjustment of the path along which the steerable part 108 moves relative to the yoke 109 during lateral movement enables the sensitivity of the steerage to lateral deviations to be adapted to the requirements of the operation to be performed and the required maneuverability of the tractor with the implement running in front of it. It would also be impossible to achieve this goal by rendering the mutual distance between the guide elements 128–131 on the left-hand side and the right-hand side of the central longitudinal plane 10 adjustable.

In the setting shown in FIGS. 2 and 3, the guides 126, 127 are positioned so that upon lateral movements from the straight-on position, the steerable part 108 at the engagement positions 118a, 116b on one side initially moves forwards the same distance as the steerable part 108 at the engagement positions 119a, 119b on the other side moves rearwards relative to the yoke structure. However, as soon as any movement of the steerable part 108 is involved, there is created a difference between the extent to which the steerable part 108, with the increase of the lateral movement, moves forwards at the engagement positions 118a, 118b on one side, and to which it moves rearwards at the engagement positions 119a, 119b on the other side. As soon as the lateral movement is so great that both rollers 130, 131 on said other side run across the straight rear side 120 of the beam 121 of the implement 103, a path of the lateral movement of the steerable part is reached within which the steerable part 108 at the other (the right-hand one in the Figure) engagement positions 119a, 119b substantially do not move in the processing direction relative to the yoke 109.

Consequently, after a short lateral displacement, within which the implement is actually sensitive to uneven rearward loads and can react thereto by moving laterally, a lateral displacement path is realized within which the implement is less sensitive to imbalance in the lateral load, in particular if the rearwardly directed load is greatest on the rearwardly displaced side of the implement. Consequently, in reaction to imbalance in the rearwardly directed load, the implement in practice seldom, if ever, moves laterally beyond the beginning of the above-discussed lateral movement path.

Since the steerable part 108 at the engagement positions 119a, 119b on the other side, relative to the yoke structure 109, substantially does not move in the processing direction, or moves at the most with a substantially constant ratio with respect to the lateral movement, and moves continuously a distance lest than the forward displacement at the engagement positions 118a, 18b on the one side, it is moreover effected that the steerability in reaction to lateral movements is not impeded by substantially increasing forward displacements, during greater movements, of the steerable part at the engagement points 119a, 119b on the side of the inside bend.

In this manner, on the one hand the occurrence of lateral movements above a particular minimum in reaction to imbalance in the rearward loads is limited, but on the other, the control of the implement when taking sharper bends is not impeded by forward displacements, at very great lateral movements, of the implement at the engagement points on the side of the inside bend.

By setting the guides 126, 127 far away from each other, the gear can be adjusted so that in reaction to lateral movements occurring in practice, the implement does not steer at all. This last is advantageous if the gear is used in combination with an implement provided with means for correcting, in reaction to for instance signals or movements of path-determining provisions, lateral deviations of the tractor relative to the intended path.

With the steering gear incorporated into the coupling according to FIGS. 2 and 3, during lateral displacement relative to the yoke 109, the steerable part 108 in fact moves forwards in the area of one set of engagement points 118a, 118b and backwards in the area of the other set of engagement points 119a, 119b, as illustrated in FIG. 3. However, the rearward displacement of the steerable part 108 at or at least on the side of the one set of support points 119a, 119b is immediately smaller than the forward displacement of the steerable part 108 at or at least on the side of the other set of engagement points 118a, 118b. In this gear, too, lateral displacement of the steerable part thus involves relatively little rearward displacement of the implement 103, so that imbalance in rearward forces exerted on the implement 103 has little influence on lateral movements of the implement 103.

FIG. 3 also illustrates that the transmission structures on either side of the central longitudinal plane 110 are of such design that upon a lateral displacement of the steerable part 108 relative to the yoke 109 from the straight-on position (indicated by the center line 140, swiveled out relative to the central longitudinal plane 110), the steerable part 108 swivels relative to the yoke 109 about a part of one of the transmission structures, in this illustration the transmission structure on the right-hand side of the central longitudinal plane 110. Upon steering to the left in reaction to a lateral displacement of the. steerable part 108 to the right, the steerable part rotates, at least within a lateral movement path starting with a small minimum movement, about the other transmission structure on the left-hand side of the central longitudinal plane 110. In this manner, the steerable part in each case rotates about the transmission structure that is located most on the inside of the bend described by the implement. As a result, a very great difference between the rearward forces exerted on the implement 103 on both sides of the relevant transmission structure is needed to cause the implement 103 to swivel out. Hence, in practice, the implement 103 moves very rarely, if at all, in reaction to imbalance in rearward forces exerted on the implement.

In the gears according to the examples shown in FIGS. 1–3, the steerable part 8, 108 is provided with guideways and the guide elements 12, 13, 128–131 are supported by the yoke 9, 109. Such a construction is for instance advantageous if the implement to be controlled has a beam or other structure of which a portion is suitable for forming the guideways.

Figure 4:
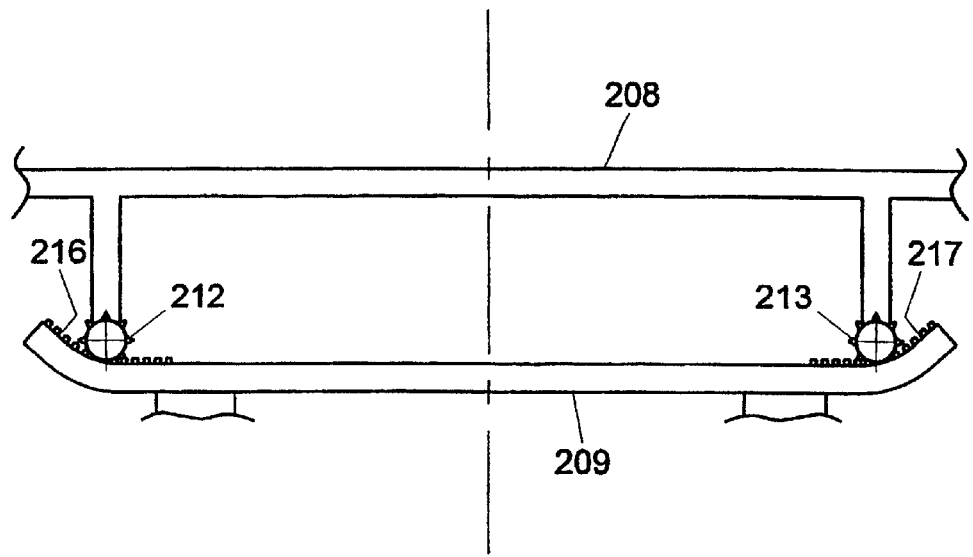
FIG. 4 is a further schematized, cut-off top plan view of a third exemplary embodiment of a coupling.

FIG. 4 shows an alternative exemplary embodiment, wherein the yoke 209 is provided with guideways 216, 217 and wherein the guide elements 212, 213 are supported by the steerable element 208. Such a construction is advantageous for applications where implements have to be changed frequently or where a large number of different implements have to be controlled by means of the coupling. As the guideways are coupled to the tractor and do not form a part of the steerable part to which the implement is coupled or which is integrated into the implement, the implement can in many cases be of a lighter, more compact, simpler and cheaper design.

In the steering gear according to this example, the guideways 216, 217 and the guide elements designed as rollers 212, 213, are provided with enmeshing teeth, so that the rollers 212, 213 also rotate if the guideways 216, 217 have become slippery, for instance by mud. The use of toothed rollers and guideways moreover enables using rollers which are oval and/or have their rotation axes in an eccentric position. The forward movement, on one side, of the steerable part relative to the yoke during lateral movements thereof relative to that yoke, can then be effected without using curved or bent guideways, but through the displacement of the rotation axes of the rollers depending upon the rollers rolling down the guideway. For that purpose, the rollers may for instance be (in side elevation) oval, egg-shaped, or round with an eccentric rotation axis.

Figure 5:
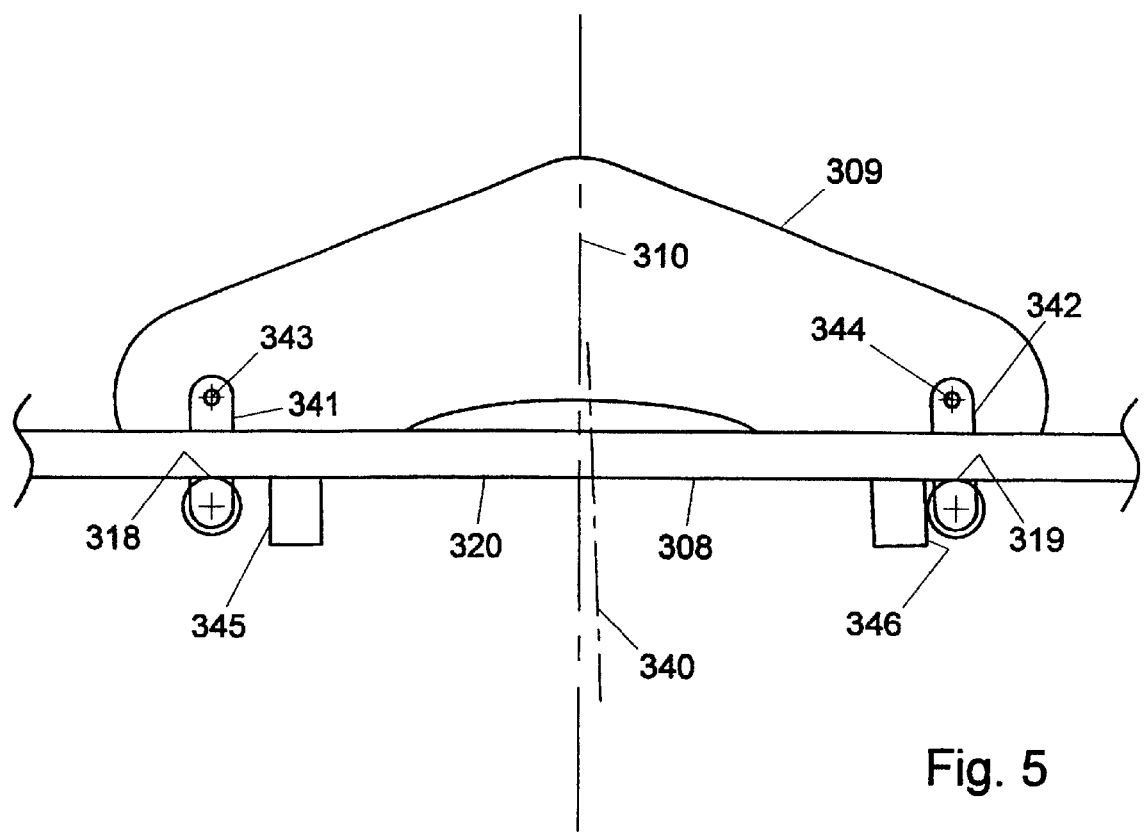
FIGS. 5–8 are cut-off top plan views of a further coupling for suspending an implement in front of a tractor.

In the exemplary embodiment shown in FIG. 5, the forward movement of the steerable part 308 at one engagement point 319, which forward movement occurs during lateral movement of that steerable part relative to the yoke 309, in combination with the non-occurrence of an actual rearward displacement of the steerable part 308 at the other engagement point 318, is effected in a different manner.

In the gear according to this exemplary embodiment, the transmission structures are each designed with a pivotable rocker 341, 342, which rockers are mounted for pivoting about substantially vertical axes 343, 344 between the yoke 309 and the steerable part 308, such that during a lateral displacement of the steerable part 308 relative to the yoke 309 from the straight-on position, one of the rockers (the right-hand rocker 342 in the situation according to FIG. 5) urges the steerable part 308 forwards relative to the yoke 309, and the other one of the rockers (the left-hand rocker 341 in the situation according to FIG. 5) substantially causes the steerable part 308 not to move rearwards relative to the yoke 309. Thus, the intended control effect is achieved, as indicated in FIG. 5 through the displacement of the central longitudinal plane 340 of the steerable part 308 relative to the central longitudinal plane 310 of the yoke 309.

The rockers could also be mounted in such a manner that the steerable part during lateral displacement could actually move slightly rearwards at the other rocker, but directly less than the forward displacement at the first rocker, so that a steering movement is always accompanied by a net forward displacement of the steerable part.

In the gear according to this example, the intended behavior of the rockers 341, 342 is achieved in that one end of each of the rockers 341, 342 is displaceable, from the straight-on position, in lateral direction along a guide surface 320 of the steerable part 308 and in that stops 345, 346 are provided for limiting said lateral displaceability. The stops 345, 346 are of such design that upon lateral displacement of the steerable part 308 relative to the yoke 309 from the straight-on position, the rockers each pivot along if the steerable part 308 at that rocker 341, 342 moves away from the central longitudinal plane 310 of the yoke 309 and pivot along less or not at all if the steerable part 308 at that rocker moves towards the central longitudinal plane 310 of the yoke 309. This means that during lateral movement of the steerable part 308 to the left, particularly the left rocker 341 swivels out so as to urge the steerable part 308 forwards particularly on the left-hand side, and that during lateral movement of the steerable part 308 to the right, particularly the right rocker 342 swivels out so as to urge the steerable part 308 forwards particularly on the right-hand side. In fact, it would also be possible to pivotally connect the rockers to the steerable part and to design them for lateral movement along the yoke. However, the stops would then have to be arranged on the outside of the rockers. The question whether it is more advantageous to design the rockers for movement along the steerable part or for movement along the yoke depends on the structure of the implements to be traversed, the number of implements that are to be controlled by a specific coupling and the frequency at which the implement is to be changed.

Figure 6:
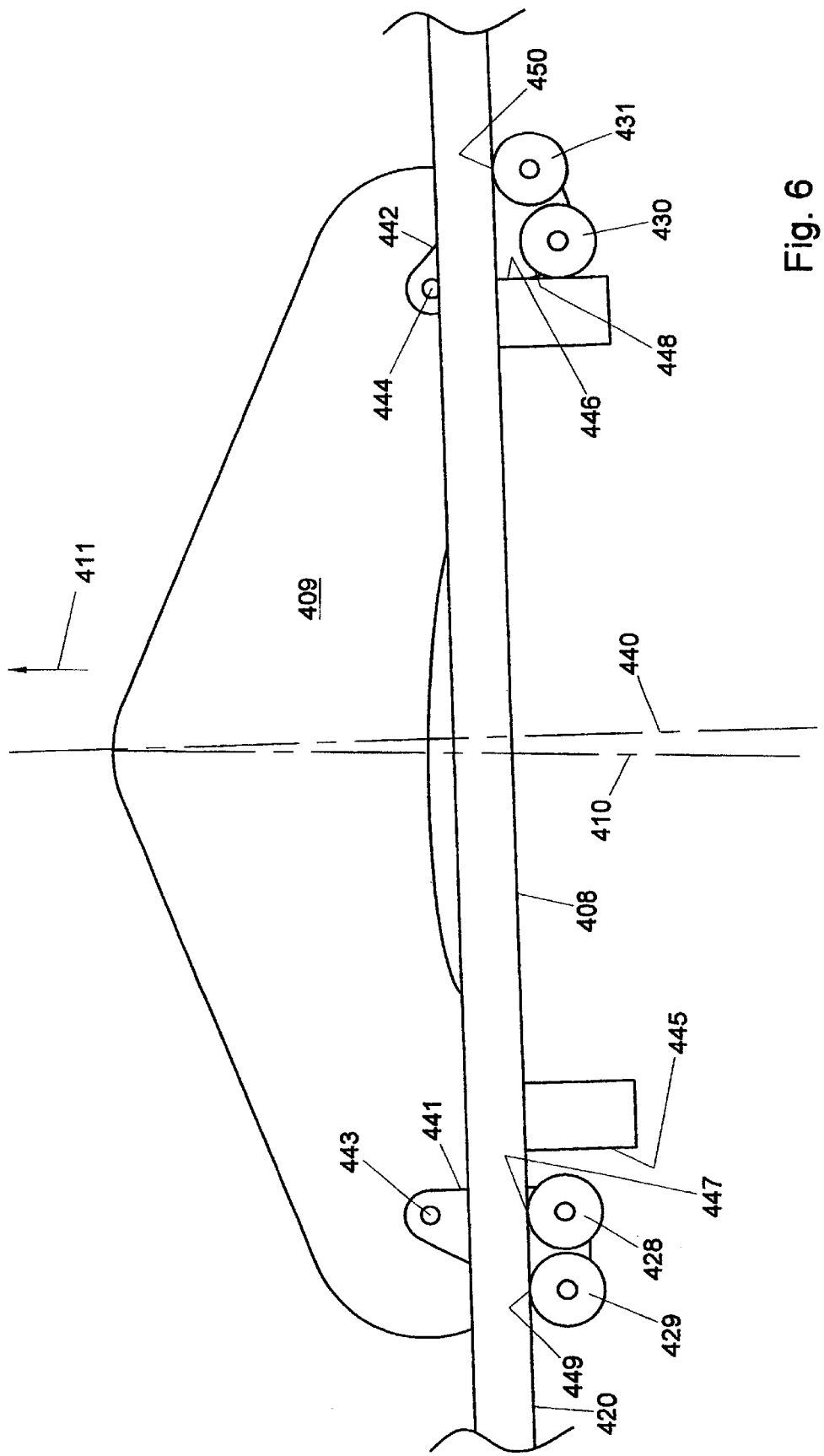

In the gear according to the example shown in FIG. 6, the rockers 441, 442 are provided with first abutting surfaces 447, 448 and second abutting surfaces 449, 450 for abutment against the guideway 420 of the steerable part 408. The first abutting surfaces 447, 448 abut against the steerable part 408 if the rockers 441, 442 are in the straight-on position. The second abutting surfaces 449, 450 abut against the steerable part 408 if the rockers 441, 442 are in the swiveled-out position and are then, viewed in direction of processing (arrow 411), closer to the pivotal axes 443, 444 of the rockers 441, 442 than the first abutting surfaces 447, 448. Thus, the forwardly urging action of the rockers 441, 442 in the swiveled-out position is enhanced. Like the gear shown in FIG. 5, the swivel movement of the rockers 441, 442 during lateral displacement of the steerable part 408 is in each case controlled by one of the rockers 441, 442 being carried along by stops 445, 446.

In FIG. 6, the steering movement of the steerable pare 408 relative to the yoke 409 is indicated by the displacement of the central longitudinal plane 440 of the steerable part 408 relative to the central longitudinal plane 410 of the yoke 409.

This principle can also be used if the rockers are designed for pivoting about the steerable part and for displacement along the yoke.

The engagement surfaces of the rockers 441, 442 are formed by portions, facing a guideway 420 of the steerable part 408, of the outer circumference of rollers 428–431 suspended in the rockers 441, 442. This enables the rockers 441, 442 to move along the guideway 420 of the steerable part 408 with little friction and wear also in the case of heavy loads.

The stops for carrying along the rockers during lateral movements of the steerable part can in fact also be designed as draw link, of which one end is connected to the steerable part and the other end is connected to one of the rockers, One of the ends is slidably guided and provided with a stop, so that the rockers are each carried along if the steerable part on the side of the relevant rocker moves outwards. The length and position of the draw links are preferably such that in the straight-on position, the two rockers are directed substantially parallel to the axis of symmetry in the processing direction by the implement and the farm tractor. The positions of the stops are preferably adjustable, allowing the steering properties of the coupling to the adapted to the paths to be traveled, the properties of the soil, the required accuracy with which paths are followed and the behavior of the implement to be advanced.

Figure 7:
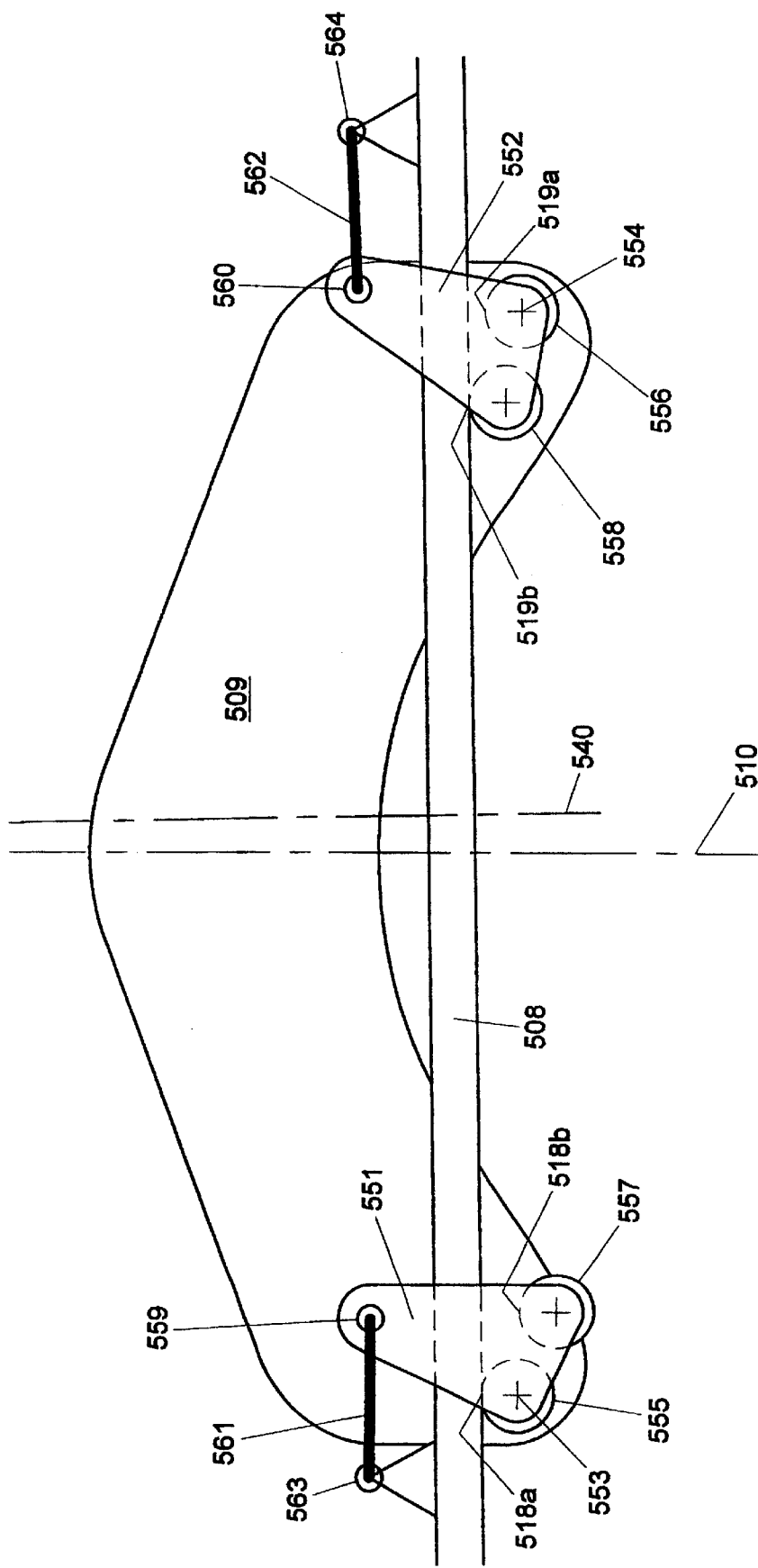

FIG. 7 shows a further exemplary embodiment of a gear according to the invention. The gear according to this examples constitutes the presently most preferred embodiment of the invention.

In the gear according to this example, the yoke.509 carries tumbler bodies 551, 552, suspended from the yoke 509 for swiveling about axes 553, 554.

The tumbler bodies 551, 552 each carry support members 555, 556 which define engagement points 518 a, 519a located in substantially fixed positions, at least in processing direction (arrow 511), relative to the axes 553, 554 and the yoke 509. On the inside of those support members 555, 556, in fixed positions relative to the axes 553, 554, the tumbler bodies 551, 552 each carry a support member 557, 558 which can swivel along with the tumbler body 551, 552 around the relevant pivotal axis 553, 554. These co-pivotable tumbler bodies 551, 552 define engagement points 518b, 519b which move in processing direction during rotation of the tumbler bodies and engage the steerable part 508 only if they are located in processing direction before the engagement point 518a and 519a respectively, on the same side of the steering gear. The tumbler bodies 551, 552 further each carry an engagement point 559, 560, where a draw link 561, 562 engages the tumbler body. At their ends remote from the relevant tumbler body 551, 552, the draw links 561, 562 are pivoted to the steerable part 508 at the location of engagement points 563, 564.

In the drawing, the steerable part is shown in a position where is has moved to the right relative to the straight-on position, as appears from the mutual positions of the central longitudinal plane 510 and the center line 540 of the steerable part.

If the steerable part 508 moves laterally, it carries along the tumbler bodies 551, 552, causing them to tumble around their axes 553, 554. On the side that is to be displaced forwards, the tumbler body 552 rotates outwards, causing the co-pivotable support member 558, in the straight-on position located on the inside of the associated tumble axis 554, to displace the steerable part 508 at one transmission structure forwards relative to the yoke 509.

The other tumbler body 551 rotates inwards, so that the co-pivotable support member 557, located on the inside of the tumble axis 553, pivots away from the steerable part 508 and the steerable part remains resting against the other support member 555, fixed relative to the tumble axis 553, and hence is not pushed forwards relative to the yoke 509 at the left-hand transmission structure, but cannot move rearwards together with the co-pivotable support member 557, either. Thus, during lateral movements, the steerable part is actually urged forwards on one side for effecting the intended steering movement, but it can hardly, if at all, move rearwards on the other side, as a result of which lateral movements in reaction to imbalance between the rearward loads of the implement are prevented.

It is observed that to this exemplary embodiment, too, many variants are possible. For instance, the tumbler bodies may also be of such design, that the engagement points are located behind the pivotal axes, while the engagement points that are reciprocable in the direction of movement are located on the outer side of the pivotal axes, rather than on the inner side of the pivotal axis, as shown in FIG. 7. Further, the fixed support may also be located other than in the area of the pivotal axes or be integrated with the co-pivotable support to form a cam body. Further, it is also possible to reach the limitation of the rearward diplaceability of the steerable part at the transmission structures by bounding the rotatability thereof relative to the yoke. In that case, no fixed support for bounding rearward displacement of the steerable part is needed.

Figure 8:
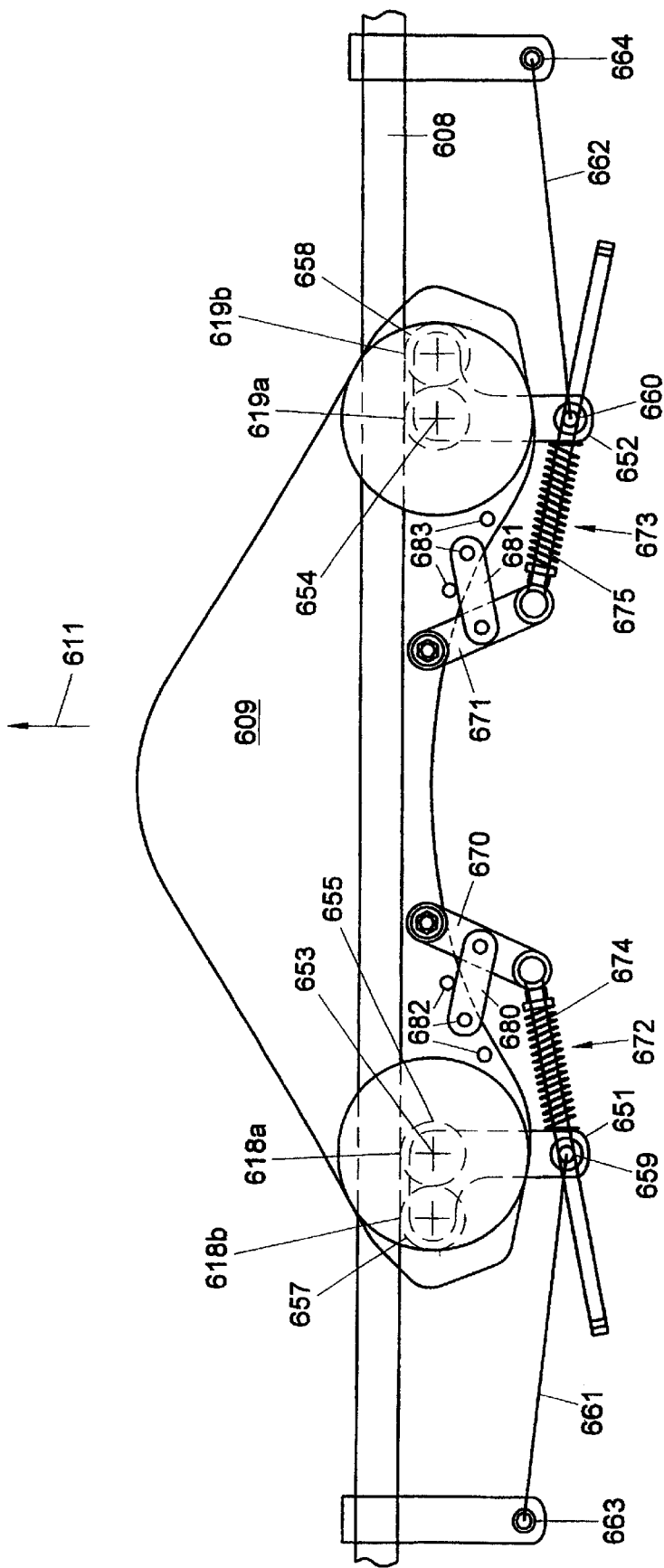

FIG. 8 shows a further exemplary embodiment of a gear according to the invention.

In the gear according to this example, the yoke 609 carries tumbler bodies 651, 652 which are suspended from the yoke 609 for pivoting about axes 653, 654.

The tumbler bodies 651, 652 each carry support members 655, 656, which at the location of engagement points 618a, 619a engage a steerable part 608. These engagement points 618a, 619a are located in substantially fixed positions, at least in processing direction (arrow 611), relative to the axis 653, 654 and the yoke 609. At a distance from the outer side of the support members 655, 656, the tumbler bodies 651, 652 each carry a support member 657, 658 that is co-pivotable with the tumbler body 651, 652 about the relevant pivotal axis 653, 654. These co-pivotable support members 657, 658 engage the steerable part 608 at the location of engagement points 618b, 619b which, upon rotation of the tumbler bodies, move in processing direction 611. The tumbler bodies 651, 652 further each carry an engagement point 659, 660 at a distance behind the associated pivotal axis 653, 654, where a cable 661, 662 engages the tumbler body 651, 652. At their ends remote from the relevant tumbler bodies 651, 652, the cables 661, 662 are attached to the steerable part 608 at the location of engagement points 663, 664.

The yoke 609 further carries coupling pieces 670, 671, each having one end thereof pivoted to the yoke 609. These coupling pieces 670, 671 each have their other ends connected to a provision 672, 673 for exerting a pressure force-over a work path. In this exemplary embodiment, these provisions are designed as spring legs 674, 675 having biased helical springs. The springs of the spring legs 674, 675 abut against the tumbler body 651, 652 and against a stop at a fixed distance from the end, remote from the yoke 609, of the relevant coupling piece 670, 671. The springs can be biased, which bias can be set by adjusting the position of the coupling pieces 670, 671 relative to the yoke 609. To this end, setting arms 680, 681 are provided, each being pivoted to the relevant coupling piece 670, 671 at a distance from the pivotal axis between the yoke and that coupling piece 670, 671. The yoke 609 is provided with a series of setting positions formed by holes 682, 683, where the ends of the setting arms 680, 681 can be coupled to the yoke 609. By selecting a specific hole 682, 683, the bias of the springs of the spring legs 672, 673 can be set.

It is also possible to achieve the adjustability of the setting arms 680, 681 by rendering the effective length thereof adjustable, for instance by means of screw spindles in longitudinal direction of the setting arms.

It is observed that the bias of the springs that exert a force on the left and the right tumbler body 651, 652 can be set to differ.

If the spring legs 672, 673 are mounted in such a manner that they do not take off against the yoke 609, via the coupling pieces 670, 671 and the setting arms 680, 681, but take off against the other tumbler body 651, 651, via or not via coupling pieces that are suspended so as to be freely pivotable relative to the yoke, the advantageous effect thus achieved is that during lateral movement of the steerable part, the spring force exerted on the tumbler body that is not carried along by the lateral movement of the steerable part decreases. This facilitates co-rotation of that tumbler body with the steerable part. This co-rotation moreover supports the spring force on the side where the steerable part is pressed forwards by the tumbler body. Further, when the spring function is arranged between the tumbler bodies, a spring leg which is preferably mounted centrally or directly between the tumbler bodies may suffice.

When the steerable part 608 for instance moves laterally to the right relative to the yoke 609—which in most cases is caused by leftward movement of the yoke 609 due to a steering movement of the tractor—, it carries along the right-hand tumbler body 652, causing this body to pivot about the axis 654. This involves the tumbler body 652 pivoting outwards, which causes the co-pivotable support member 658, located in the straight-on position on the outside of the associated tumble axis 654, to push the steerable part 608 forwards relative to the yoke 609. This pivoting movement of the tumbler body 652 is supported by the force exerted thereon by the spring 675, which spring 675 takes off against the yoke via the coupling piece 671 and the setting arm 681. The cable 661 on the other side cannot take up any pressure forces and is slack, so that it does not impede the lateral movement of the steerable part 608. The other tumbler body virtually remains in its starting position and only rotates along with the steering movement of the steerable part 608

In this manner, upon lateral movements, the steerable part 608 is indeed forced forwards on one side, for effecting the intended steering movement, but it can hardly, if at all, move rearwards on the other side, so that lateral movements in reaction to imbalance between the rearward loads of the implement are inhibited. This involves the spring 674 or 675 exerting a force on the tumbler body 651 or 652 respectively, thus supporting the forward displacement on the side to which the steerable part 608 is moving.

Since the biased springs 674, 675 provide for a part of the force required for laterally displacing and forwardly urging the steerable part 608 relative to the yoke 609, the transverse force required for displacing the yoke 609 sidewards in such a manner that a particular lateral movement of the steerable part 608 and an associated steering movement thereof is effected—which force is co be exerted on the soil by the wheels of the tractor as lateral friction force—decreases. This for instance improves the steering behavior on a relatively slippery or loose subsoil, where the lateral grip of the wheel on the soil is slight. In addition, the speed at which the steerage reacts is increased.

It is observed that for supporting lateral movements and associated steering movements of the steerable part, many variants are possible as well. For instance, the provisions for exerting, over a work path, a force on the transmission structure, and the position where these means engage, may be designed in various manners.

Instead of the coupling between a steerable part 608 and the tumbler bodies 651, 652 by means of cables, a rigid bar may for instance be used, which bar extends through an eye provided on the tumbler body and comprises a stopper for obtaining the desired power transmission in one direction. Further, the coupling pieces may receive support from each other rather than from the yoke 609. In the embodiment according to FIG. 1, support of the steering movements of the steerable part may for instance be achieved by exerting a forward force, acting over a work path, on the steerable part 8 at a location or on either side of the center line of the yoke 9. It is further observed that the support of forward movements of the steerable part may also be exclusively arranged on one side of the center line of the yoke, for instance during hoeing with a hoe beam which on the side of the center line of the yoke where the support is provided projects further than on the other side.

From the foregoing, it will be readily understood by anyone skilled in the art that within the framework of the present invention, many variants other than the examples described hereinabove are possible. For instance, instead of the yoke, there may also be employed a yoke structure which may, for instance, consist of several parts that can be mounted on a tractor as an assembly or separately,

What is claimed is:

1. A steering gear for controlling an implement in a coupling between a tractor and said implement mounted in front of the tractor, comprising:

a yoke structure for coupling to the tractor, a part which is steerable relative to the yoke structure, and at least two transmission structures between the steerable part and the yoke structure, said transmission structures, in a straight-on position, being spaced apart at least in a horizontal direction transverse to a processing direction and which define engagement positions for exerting forces having at least one component in the processing direction on the steerable part and are arranged for allowing lateral movement of the steerable part from a straight-on position to the left and to the right relative to the yoke structure, and, when the steerable part moves to the left, for urging the steerable part forwards relative to the yoke structure at the left one of said engagement positions, causing it to steer to the right, and, when the steerable part moves to the right, for urging the steerable part forwards relative to the yoke structure at the right one of said engagement positions, causing it to steer to the left, wherein the transmission structures are of such design that during a lateral movement of the steerable part within at least a specific path, wherein the steerable part at said one of said engagement positions moves forwards, any rearward movement of the steerable part at the other one of said engagement positions, relative to the yoke structure is limited to movement with a substantially constant ratio relative to the lateral movement and continuously by a distance less than the forward displacement at said one of the engagement positions, in the processing direction or against the processing direction.

2. A steering gear for controlling an implement in a coupling between a tractor and said implement mounted in front of the tractor, comprising:

a yoke structure for coupling to the tractor, a part which is steerable relative to the yoke, and at least two transmission structures between the steerable part and the yoke structure, said transmission structures, in a straight-on position, being spaced apart at least in a horizontal direction transverse to a processing direction and which define engagement positions for exerting forces having at least one component in the processing direction on the steerable part and are arranged for allowing lateral movement of the steerable part from a straight-on position to the left and to the right relative to the yoke structure, and, when the steerable part moves to the left, for urging the steerable part forwards relative to the yoke structure at the left one of said engagement positions, causing it to steer to the right, and, when the steerable part moves to the right, for urging the steerable part forwards relative to the yoke structure at the right one of said engagement positions, causing it to steer to the left, wherein the transmission structures are of such design that during a lateral movement of the steerable part and an associated forward displacement of the steerable part at said one of said engagement positions, any rearward movement of the steerable part at the other one of said engagement positions, relative to the yoke structure is limited to movement which is immediately by a distance less than the forward displacement at said one of the engagement positions.

3. A gear according to claim 2, wherein the transmission structures are of such design that during a lateral movement of the steerable part relative to the yoke structure, the steerable part pivots relative to the yoke structure about a point in the area of said other one of said transmission structures.

4. A gear according to claim 2, wherein in said straight-on position, the forces exerted on the steerable part are directed substantially parallel to said processing direction.

5. A gear according to claim 2, wherein in said straight-on position, said engagement positions on at least one side act on a surface oriented substantially at right angles to said processing direction.

6. A gear according to claim 2, wherein said transmission structures each contain at least one guideway and a guide element that is displaceable along said guideway according to an at least locally curved path, wherein, starting from said straight-on position, the angle of said path relative to said processing direction on one side of the associated guide element is in each case smaller than on the other side of the guide element.

7. A gear according to claim 6, wherein said guideways are arranged symmetrically and at a distance from each other on either side of a vertical central longitudinal plane which is directed in said processing direction.

8. A gear according to claim 6, wherein said guideways extend horizontally.

9. A gear according to claim 6, wherein said guideways are profiled and said guide elements, viewed in section transversely to said guideways, have a contour that corresponds to said profile.

10. A gear according to claim 6, wherein said guide elements are provided with rollers.

11. A gear according to claim 10, wherein said guideways and said rollers have enmeshing teeth.

12. A gear according to claim 10, wherein the positions of said rollers are adjustable for adjusting the mutual distance between the rollers.

13. A gear according to claim 10, wherein each of said guide elements is formed by at least two rollers suspended in a roller support, wherein the rotation axes of said rollers are in each case located on either side of pivotal axes of said roller supports.

14. A gear according to claim 13, wherein the distance between two rollers supported by the same roller support is adjustable.

15. A gear according to claim 6, wherein said steerable part is provided with said guideways and wherein said guide elements are supported by said yoke structure.

16. A gear according to claim 6, wherein said yoke structure is provided with said guideways and wherein said guide elements are supported by said steerable element.

17. A gear according to claim 6, wherein said guideways contain straight sections, and wherein in said straight-on position, said engagement positions are located in the area of said straight sections, and wherein said straight sections are directed transversely to said processing direction and blend with curved sections of said guideways.

18. A gear according to claim 6, wherein the position and orientation of said guideways are adjustable.

19. A gear according to claim 6, wherein the mutual distance between said guide elements is adjustable.

20. A gear according to claim 2, wherein said transmission structures each comprise a pivotable body, said pivotable bodies being mounted for pivoting about substantially vertical axes between the yoke structure and the steerable part such that during a lateral movement of the steerable part relative to the yoke structure, one of said pivotable bodies urges the steerable part forwards relative to the yoke structure and the other one of said pivotable bodies causes the steerable part, relative to the yoke structure, substantially not to move rearwards or at least to move rearwards immediately and by a distance less than the forward displacement caused by said one of said pivotable bodies.

21. A gear according to claim 2, wherein said transmission structures each comprise a pivotable body, said pivotable bodies being mounted for pivoting about substantially vertical axes between the yoke structure and the steerable part such that at least during a lateral movement of the steerable part relative to the yoke structure within a specific path, wherein said one of said pivotable bodies urges the steerable part forwards relative to the yoke structure, the other one of said pivotable bodies causes the steerable part, relative to the yoke structure, substantially not to move rearwards or at the most to move rearwards with a substantially constant ratio relative to the lateral movement and continuously less than the forward displacement caused by said one of said pivotable bodies.

22. A gear according to claim 20, wherein the pivotable bodies are each designed as a tumbler body suspended for pivoting about an axis relative to the yoke structure or the pivotable part, further comprising: supports that can pivot along with the tumbler bodies and that engage the steerable part or the yoke structure respectively, carriers for causing the tumbler bodies to swivel in reaction to lateral movement of the steerable part, and means for limiting lateral displacements of the steerable part relative to rearward displacements of supports that can swivel along with the tumbler bodies from the straight-on position.

23. A gear according to claim 20, wherein the pivotable bodies are designed as rockers, wherein one end of each of the rockers is displaceable from the straight-on position in lateral direction along the yoke structure or the steerable part, further comprising stops for limiting said lateral displaceability, said stops being of such design that each of said rockers, during lateral movements of the steerable part relative to the yoke structure, swivels along if the steerable part at that rocker moves away from a central longitudinal plane directed in said processing direction and pivots along less or not at all if the steerable part at that rocker moves towards said central longitudinal plane.

24. A gear according to claim 23, wherein the rockers are laterally displaceable along the steerable part and wherein the stops are located between said central longitudinal plane and said rockers.

25. A gear according to claim 23, wherein the rockers are laterally displaceable along the yoke structure and wherein the stops are located on the sides of said rockers remote from said central longitudinal plane.

26. A gear according to claim 23, wherein said stops for limiting said lateral displaceability of the rockers are displaceable from the straight-on position in lateral direction for adjusting the extent to which lateral displaceability of the rockers from the straight-on position in lateral direction is limited.

27. A gear according to claim 23, wherein the rockers are each provided with at least a first and a second abutment surface for abutment against the steerable part or the yoke structure, wherein the first of said abutment surfaces abuts against the steerable part or the yoke structure if the rocker is in the straight-on position and wherein the second one of said abutment surfaces abuts against the steerable part or the yoke structure if the rocker is in the swiveled-out position and, viewed in processing direction, is located closer to the pivotal axis of the relevant rocker than the first one of said abutment surfaces of the same rocker, for enhancing the forwardly urging action of the swiveled-out rocker.

28. A gear according to claim 2, further comprising means for exerting, over a work path, a force that supports a displacement of the steerable part in the processing direction.

29. A gear according to claim 28, wherein said means for exerting a force over a work path are mounted between at least one of said transmission structures and the yoke structure.

30. A gear according to claim 28, wherein said at least one transmission structure comprises a pivotable body for urging the steerable part in processing direction in reaction to pivoting movements of said body, wherein said pivotable body is connected to the steerable part and the yoke for pivoting from the straight-on position, operated by lateral movements of the steerable part relative to the yoke, to exclusively one side relative to the straight-on position of the steerable part.

31. A gear according to claim 30, wherein the connection between the steerable part and the pivotable part is formed by a connection designed for exclusively transmitting pulling forces.

32. A gear according to claim 28, wherein the means for exerting a force over a work path comprise an elastic element.

33. A gear according to claim 28, wherein the means for exerting a force over a work path, in condition of use, are biased in the straight-on position.

* * * * *